United States Patent
Lu et al.

(10) Patent No.: US 10,277,286 B2
(45) Date of Patent: Apr. 30, 2019

(54) DETERMINING POSITION OF A WIRELESS DEVICE USING REMOTE RADIO HEAD DEVICES WITH MULTIPLE ANTENNA DEVICES

(71) Applicant: Telefonaktiebolaget LM Ericsson (publ), Stockholm (SE)

(72) Inventors: Chenguang Lu, Sollentuna (SE); Miguel Berg, Upplands Väsby (SE); Elmar Trojer, Täby (SE); Per-Erik Eriksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 58 days.

(21) Appl. No.: 15/107,165

(22) PCT Filed: Dec. 23, 2013

(86) PCT No.: PCT/SE2013/051616
§ 371 (c)(1),
(2) Date: Jun. 22, 2016

(87) PCT Pub. No.: WO2015/099582
PCT Pub. Date: Jul. 2, 2015

(65) Prior Publication Data
US 2017/0033842 A1 Feb. 2, 2017

(51) Int. Cl.
*H04B 7/024* (2017.01)
*G01S 5/14* (2006.01)
(Continued)

(52) U.S. Cl.
CPC .......... *H04B 7/024* (2013.01); *G01S 5/0036* (2013.01); *G01S 5/0252* (2013.01); *G01S 5/10* (2013.01);
(Continued)

(58) Field of Classification Search
CPC .......... H04B 7/024; H04B 7/0413; G01S 5/14; G01S 5/10; G01S 5/0036; G01S 5/0252; H04W 64/00; H04W 88/08; H04W 88/085
See application file for complete search history.

(56) References Cited

U.S. PATENT DOCUMENTS

| 2011/0149887 A1* | 6/2011 | Khandekar | ............ G01S 5/0081 |
| | | | 370/329 |
| 2011/0237272 A1 | 9/2011 | Gorokhov et al. | |

(Continued)

FOREIGN PATENT DOCUMENTS

| ES | 2333506 A1 | 2/2010 |
| GB | 2496178 A | 5/2013 |

(Continued)

OTHER PUBLICATIONS

International Search Report and Written Opinion for International Patent Application No. PCT/SE2013/051616, dated Oct. 31, 2014, 8 pages.

(Continued)

*Primary Examiner* — Kwang B Yao
*Assistant Examiner* — Moo Jeong
(74) *Attorney, Agent, or Firm* — Withrow & Terranova, PLLC (57) ABSTRACT

It is presented a method for determining a position of a wireless device, the method being performed in a network node connected to a plurality of remote radio head devices each comprising a first antenna device which can be used for a first MIMO, multiple input multiple output, stream and a second antenna device which can be used for a second MIMO stream. The method comprises the steps of: sending a first cell identifier for transmission on both the first antenna device and the second antenna device of each one of the remote radio head devices; sending a second cell identifier, (Continued)

for transmission on an antenna device of only a specific remote radio head device; receiving a measurement report from the wireless device associated with the second cell identifier; and determining a position of the wireless device based on the received measurement report.

18 Claims, 4 Drawing Sheets

(51) Int. Cl.
| | | |
|---|---|---|
| | *G01S 5/10* | (2006.01) |
| | *G01S 5/00* | (2006.01) |
| | *G01S 5/02* | (2010.01) |
| | *H04B 7/0413* | (2017.01) |
| | *H04W 64/00* | (2009.01) |
| | *H04W 88/08* | (2009.01) |

(52) U.S. Cl.
CPC ............. *G01S 5/14* (2013.01); *H04B 7/0413* (2013.01); *H04W 64/00* (2013.01); *H04W 88/08* (2013.01); *H04W 88/085* (2013.01)

(56) References Cited

U.S. PATENT DOCUMENTS

| | | | |
|---|---|---|---|
| 2012/0009957 A1* | 1/2012 | Murasawa | H04W 8/26 455/507 |
| 2012/0108270 A1* | 5/2012 | Kazmi | H04W 64/00 455/456.5 |
| 2012/0231809 A1* | 9/2012 | Siomina | H04W 64/00 455/456.1 |
| 2013/0121379 A1 | 5/2013 | Wang | |
| 2013/0308590 A1 | 11/2013 | Ihm et al. | |
| 2013/0343301 A1 | 12/2013 | Geirhofer et al. | |
| 2014/0092787 A1 | 4/2014 | Han et al. | |
| 2014/0176366 A1* | 6/2014 | Fischer | H04W 64/006 342/374 |
| 2014/0235273 A1* | 8/2014 | Ahn | G01S 5/0236 455/456.1 |
| 2015/0071112 A1 | 3/2015 | Nammi et al. | |

FOREIGN PATENT DOCUMENTS

| | | |
|---|---|---|
| WO | 2005032202 A1 | 4/2005 |
| WO | 2011091859 A1 | 8/2011 |
| WO | 2012116007 A1 | 8/2012 |
| WO | 2013066416 A1 | 5/2013 |
| WO | 2015033321 A1 | 3/2015 |

OTHER PUBLICATIONS

Author Unknown, "RP-121436: Proposed SID: Study on UMTS Heterogeneous Networks,"Huawei, 3GPP, TSG RAN Meeting #57, Sep. 4-7, 2012, Chicago, IL, 5 pages.
Author Unknown, "R1-124512: Initial considerations on Heterogeneous Networks for UMTS," Ericsson, 3GPP TSG RAN WG1 Meeting #70bis, Oct. 8-12, 2012, San Diego, CA, 7 pages.
Author Unknown, "R1-124513: Heterogeneous Network Deployment Scenarios," Ericsson, 3GPP TSG RAN WG1 Meeting #70bis, Oct. 8-12, 2012, San Diego, CA, 3 pages.
Non-Final Office Action for U.S. Appl. No. 14/265,568, dated Feb. 26, 2016, 18 pages.
Final Office Action for U.S. Appl. No. 14/265,568, dated Jun. 9, 2016, 21 pages.
Advisory Action for U.S. Appl. No. 14/265,568, dated Aug. 19, 2016, 3 pages.
Non-Final Office Action for U.S. Appl. No. 14/265,568, dated Sep. 8, 2016, 18 pages.
Final Office Action for U.S. Appl. No. 14/265,568, dated Dec. 30, 2016, 19 pages.
Advisory Action for U.S. Appl. No. 14/265,568, dated Mar. 28, 2017, 3 pages.
Notice of Allowance, Examiner-Initiated Interview Summary, and AFCP 2.0 Decision for U.S. Appl. No. 14/265,568, dated May 30, 2017, 19 pages.
Corrected Notice of Allowance, Examiner-Initiated Interview Summary, and AFCP 2.0 Decision for U.S. Appl. No. 14/265,568, dated Jun. 15, 2017, 16 pages.
International Search Report and Written Opinion for International Patent Application No. PCT/IB2014/064321, dated Nov. 27, 2014, 9 pages.
International Preliminary Report on Patentability for International Patent Application No. PCT/IB2014/064321, dated Mar. 17, 2016, 8 pages.

\* cited by examiner

Fig. 8

DETERMINING POSITION OF A WIRELESS DEVICE USING REMOTE RADIO HEAD DEVICES WITH MULTIPLE ANTENNA DEVICES

This application is a 35 U.S.C. § 371 national phase filing of International Application No. PCT/SE2013/051616, filed Dec. 23, 2013, the disclosure of which is incorporated herein by reference in its entirety.

TECHNICAL FIELD

The invention relates to a method, network node, computer program and computer program product for determining a position of a wireless device using remote radio head devices with multiple antenna devices.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient coverage with smaller cells to provide better capacity.

However, when the cells get too small, wireless terminals moving in the network cause a great number of handovers which causes significant overhead. Moreover, providing coverage indoors using many small cells can be quite costly, with a radio base station for each such small cell.

One solution to this problem is to use remote radio head devices, where several remote radio head devices connected to the same radio base station share the same cell. In this way, a single radio base station can provide coverage in different parts of the building by placing the remote radio head devices appropriately. Moreover, the wireless device can move between the coverage of different remote radio head devices while staying within the same cell, thus avoiding causing handovers.

There is also another solution with a flexible cell system, where cell configurations are dynamically changed, i.e. dynamic cell splitting and combining of multiple radio heads. Such a system can dynamically optimise between capacity and mobility (handover). In such a system, it is also common to have one cell for multiple radio heads.

However, since only one cell is used for multiple remote radio head devices, the granularity of location determination is quite large. This is a problem in locating the wireless device. Moreover, since the remote radio head devices are often deployed indoors satellite based positioning such as GPS (Global Positioning System) is often unavailable.

WO 2005/032202 presents a method for position determination of mobile stations. Additional control signals comprising virtual base station identification data are distributed in the radio system from well defined locations by e.g. transmitters. Since there is a connection between each virtual base station identification data and the location from where it is transmitted, a mobile terminal can use the information for improving its position estimation according to conventional procedures. However, this requires additional hardware dedicated to transmitting the virtual base station identification data which is costly and creates more complexity than desired.

SUMMARY

It is an object to provide better position determination of wireless devices when using remote radio head devices with multiple antenna devices.

According to a first aspect, it is presented a method for determining a position of a wireless device, the method being performed in a network node connected to a plurality of remote radio head devices each comprising a first antenna device which can be used for a first MIMO, multiple input multiple output, stream and a second antenna device which can be used for a second MIMO stream. The method comprises the steps of: sending a first cell identifier for transmission on both the first antenna device and the second antenna device of each one of the remote radio head devices; sending a second cell identifier, for transmission on an antenna device of only a specific remote radio head device; receiving a measurement report from the wireless device associated with the second cell identifier; and determining a position of the wireless device based on the received measurement report.

The steps of sending a second cell identifier and receiving a measurement report may be repeated for each one of the plurality of remote radio head devices.

The step of sending a second cell identifier may comprise sending the second cell identifier for transmission on a strict subset of antenna devices of the plurality of antenna devices of the specific remote radio head device.

The step of sending a second cell identifier may comprise sending the second cell identifier using only one antenna device of the plurality of antenna devices of the specific remote radio head device.

The method may further comprise: sending one or more further cell identifiers, for transmission on an antenna device of the remote radio head devices which are distinct from the specific remote radio head device, such that each one of these remote radio head devices is sent a different cell identifier; and receiving one or more further measurement reports from the wireless device indicating a signal strength of a signal associated with each one of the one or more further cell identifiers.

The method may further comprise a step of: blocking any cell identifier to the antenna devices of each remote radio head device being distinct from the specific remote radio head device, which antenna devices correspond to the antenna device of the specific remote radio head device which transmits the second cell identifier.

The method may further comprise the step, after the step of determining a position, of: sending the first cell identifier for transmission on both the first antenna device and the second antenna device of each one of the remote radio head devices.

The step of receiving a measurement report may comprise receiving a measurement report indicating a signal strength associated with the second cell identifier.

The step of receiving a measurement report may comprise receiving a measurement report indicating a distance from the specific remote radio head device transmitting the second cell identifier.

According to a second aspect, it is presented a network node for determining a position of a wireless device, the network node being connectable to a plurality of remote radio head devices each comprising a first antenna device which can be used for a first MIMO, multiple input multiple output, stream and a second antenna device which can be used for a second MIMO stream. The network node comprises: a processor; and a memory storing instructions that, when executed by the processor, causes the network node to: send a first cell identifier for transmission on both the first antenna device and the second antenna device of each one of the remote radio head devices; send a second cell identifier, for transmission on an antenna device of only a specific remote radio head device; receive a measurement report from the wireless device associated with the second cell identifier; and determine a position of the wireless device based on the received measurement report.

The network node may further comprise instructions that, when executed by the processor, causes the network node to repeat the instructions to send a second cell identifier and receive a measurement report are repeated for each one of the plurality of remote radio head devices.

The instructions to send a second cell identifier may comprise instructions that, when executed by the processor, causes the network node to send the second cell identifier for transmission on a strict subset of antenna devices of the plurality of antenna devices of the specific remote radio head device.

The instructions to send a second cell identifier may comprise instructions that, when executed by the processor, causes the network node to send the second cell identifier using only one antenna device of the plurality of antenna devices of the specific remote radio head device.

The network node may further comprise instructions that, when executed by the processor, causes the network node to: send one or more further cell identifiers, for transmission on an antenna device of the remote radio head devices which are distinct from the specific remote radio head device, such that each one of these remote radio head devices is sent a different cell identifier; and receive one or more measurement reports from the wireless device indicating a signal strength of a signal associated with each one of the one or more further cell identifiers.

The network node may further comprise instructions that, when executed by the processor, causes the network node to: block any cell identifier to the antenna devices of each remote radio head device being distinct from the specific remote radio head device, which antenna devices correspond to the antenna device of the specific remote radio head device which transmits the second cell identifier.

The network node may further comprise instructions that, when executed by the processor, causes the network node to: send the first cell identifier for transmission on both the first antenna device and the second antenna device of each one of the remote radio head devices.

The instructions to receive a measurement report may comprise instructions that, when executed by the processor, causes the network node to receive a measurement report indicating a signal strength associated with the second cell identifier.

The instructions to receive a measurement report may comprise instructions that, when executed by the processor, causes the network node to receive a measurement report indicating a distance from the specific remote radio head device transmitting the second cell identifier.

According to a third aspect, it is presented a computer program for a network node to determine a position of a wireless device, the network node being connectable to a plurality of remote radio head devices each comprising a first antenna device which can be used for a first MIMO, multiple input multiple output, stream and a second antenna device which can be used for a second MIMO stream. The computer program comprising computer program code which, when run on the network node causes the network node to: send a first cell identifier for transmission on both the first antenna device and the second antenna device of each one of the remote radio head devices; send a second cell identifier, for transmission on an antenna device of only a specific remote radio head device; receive a measurement report from the wireless device associated with the second cell identifier; and determine a position of the wireless device based on the received measurement report.

According to a fourth aspect, it is presented a computer program product comprising a computer program according to the third aspect and a computer readable means on which the computer program is stored.

According to a fifth aspect, it is presented a network node comprising: means for sending, by the network node when connected to a plurality of remote radio head devices each comprising a first antenna device which can be used for a first MIMO, multiple input multiple output, stream and a second antenna device which can be used for a second MIMO stream a first cell identifier for transmission on both the first antenna device and the second antenna device of each one of the remote radio head devices; means for sending a second cell identifier, for transmission on an antenna device of only a specific remote radio head device; means for receiving a measurement report from the wireless device associated with the second cell identifier; and means for determining a position of the wireless device based on the received measurement report.

The network node may comprise means for repeating the sending a second cell identifier and receiving a measurement report may for each one of the plurality of remote radio head devices.

The means for sending a second cell identifier may comprise means for sending the second cell identifier for transmission on a strict subset of antenna devices of the plurality of antenna devices of the specific remote radio head device.

The means for sending a second cell identifier may comprise means for sending the second cell identifier using only one antenna device of the plurality of antenna devices of the specific remote radio head device.

The network node may further comprise: means for sending one or more further cell identifiers, for transmission on an antenna device of the remote radio head devices which are distinct from the specific remote radio head device, such that each one of these remote radio head devices is sent a different cell identifier; and means for receiving one or more further measurement reports from the wireless device indicating a signal strength of a signal associated with each one of the one or more further cell identifiers.

The network node may further comprise means for blocking any cell identifier to the antenna devices of each remote radio head device being distinct from the specific remote radio head device, which antenna devices correspond to the antenna device of the specific remote radio head device which transmits the second cell identifier.

The network node may further comprise means for sending the first cell identifier for transmission on both the first antenna device and the second antenna device of each one of the remote radio head devices.

The means for receiving a measurement report may comprise receiving a measurement report indicating a signal strength associated with the second cell identifier.

The means for receiving a measurement report may comprise receiving a measurement report indicating a distance from the specific remote radio head device transmitting the second cell identifier.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
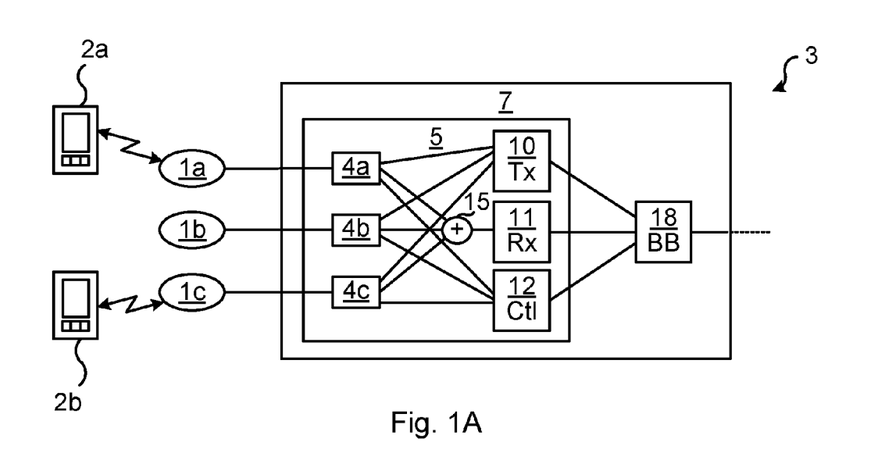
FIGS. 1A-B are schematic diagrams illustrating environments where embodiments presented herein can be applied.
Figure 1B:
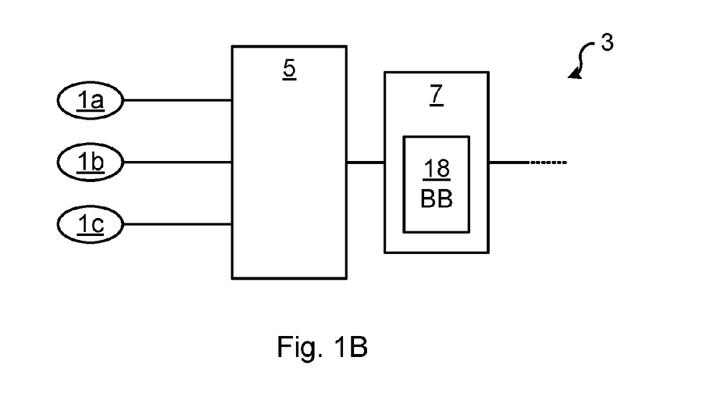

FIGS. 1A-B are schematic diagrams illustrating a wireless communication networks 3 being environments where embodiments presented herein can be applied. Considering first FIG. 1A, the wireless communication network 3 comprises a number of remote radio head devices 1a-c for installation in locations where traditional deployment with antennas being co-located with the radio base stations is not ideal. For example, the wireless communication network 3 can be installed indoors, such as in an office, shopping center, train station or airport.

It is to be noted that, while the embodiments presented herein are described as implemented using LTE (Long Term Evolution), any applicable communication standard may be used, such as any one or a combination of W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

A radio base station 7 here comprises a baseband unit (BBU) 18 and an intermediate radio unit (IRU) 5. Note that IRU may also stands for indoor radio unit. Here, a radio base station represents a base station cabinet configuration where the related units are co-located or closely located. The IRU 5 is in turn connected to a number (in this example three) remote radio head devices 1a-c via respective cables. The remote radio head devices 1a-c connected to the IRU 5 are part of a single cell 6 and thus share a cell identifier. Antennas do not need to be included in this embodiment of the radio base station 7 or the IRU 5, as the remote radio head devices 1a-c provide the wireless link to one or more wireless devices 2a-b. The wireless link provided by the remote radio head devices 1a-c includes both downlink (DL) communication to the wireless devices 2a-b and uplink (UL) communication from the wireless devices 2a-b. The term wireless device is also known as mobile communication terminal, user equipment (UE), station (STA), mobile terminal, user terminal, user agent, machine-to-machine devices etc., and can be, for example, what today are commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the IRU 5 and the remote radio head devices 1a-c.

For uplink communication, the remote radio head devices 1a-c downconvert a received (uplink) signal to IF and send it over its cable to the IRU 5. There are several instances of interface circuitry 4a-c, one for each one of the remote radio head devices 1a-c. The respective interface circuitry 4a-c extracts the received IF signal and feeds it to a combiner 15 which combines the received signals and feeds the combined received signal to the RX back-end 11. The RX back-end 11 downconverts the received signals from IF to an analogue BB (baseband) signal which is further filtered and digitised. The RX back-end 11 sends the combined received signals in digital form to the baseband unit 18 for further processing such as demodulation, decoding, etc. as known in the art per se.

Optionally, the remote radio head devices 1a-c are also powered over the respective cables.

For downlink communication, the process works in reverse to the uplink. Hence, the baseband module 18 sends a digital BB signal for transmission to a TX back-end 10 of the IRU 5. The TX back-end 10 converts the digital BB signal to an analogue transmission signal and upconverts the transmission signal to IF. The transmission signal in IF is then inserted onto the respective interface by the interface circuitry 4a-c providing the same transmission signal in IF to all connected remote radio head devices 1a-c over the respective cables. The remote radio head devices 1a-c then upconvert the IF signal to RF and transmit the RF signal over the air to the wireless devices 2a-b.

It is to be noted that the processing of uplink and downlink signals in the IRU and the remote radio head devices 1a-c do not need to occur in the digital domain and can be (but do not need to be) performed completely in the analogue domain.

The remote radio head devices 1a-c convert from IF to RF for downlink transmission and from RF to IF for uplink reception. Conversely, the IRU converts from digital BB to IF for downlink transmission and from IF to digital BB for uplink reception.

By using IF over the cables instead of RF, cheaper, low quality galvanic cables can be used, e.g. LAN cables, such as CAT5, CAT5e, CAT6 or better cables. In this way, existing indoor cabling can many times be reused during installation, which significantly saves cost and installation time.

Moreover, there is a control link between a processor 12 in the IRU 5 and each remote radio head device 1a-c. This control link can be used for configuration, performance monitoring, trouble shooting etc., e.g. to set the RF frequency used for downconversion and upconversion in the remote radio head devices 1a-c. The control signals are sent between the processor 12 and each one of the interface circuitry 4a-c for individual control links between the processor 12 and each one of the remote radio head devices 1a-c. In one embodiment, the control signals are multiplexed on a common transmission medium at least part of the way between the processor 12 and each one of the remote radio head devices 1a-c.

Measurements can be done on each individual link in the IRU 5, e.g. received power measurements.

It is to be noted that, although FIG. 1A shows the baseband unit 18 connected to one IRU 5, each baseband module 18 can be connected to several IRUs. Each IRU may have its own cell or several IRUs may share a single cell.

It is to be noted that while the embodiment of FIG. 1A shows three remote radio head devices 1a-c, there may be fewer or more remote radio head devices connected to each IRU 5.

FIG. 1B is a schematic diagram illustrating an alternative embodiment in terms of IRU and radio base station. Here, the IRU 5 is separate, but connected to, the radio base station 7. The IRU 5 itself can be implemented e.g. as shown in FIG. 1A. In this case, IRU and BBU are separated in distance. IRU and BBU are normally connected through optic fibres.

In the embodiments illustrated FIG. 1A-B, the connection between IRU and BBU may be standardised CPRI (Common Public Radio Interface) interface, which is digital.

It is to be noted that the embodiments of FIGS. 1A-B are related to an analogue transmission between the IRU/Radio Base Station and the remote radio head devices. There is an alternative embodiment related to a digital transmission between the IRU/Radio Base Station and the remote radio head devices. This can be referred to as a pico RRU (Remote Radio Unit) (pRRU) based system. The remote radio head device is a pRRU. In DL, the remote radio head device receives time-domain sampled signals, i.e. CPRI signal, from the radio base station side and converts the CPRI signal to RF signal for transmission. In UL, the remote radio head device receives the UL signal from its antennas, converts the signal to CPRI signal and send it back to the base station side for processing. In this case, the IRU between pRRU and BBU may acts as a CPRI hub. This digital implementation or other related implementation is known per se and not described herein. In such an embodiment, the remote radio head devices perform analogue to digital conversion, and vice versa, as well as downconversion/upconversion of the analogue signals from/to RF for reception and transmission from/to the wireless devices.

The embodiments above describe a radio head system with a static cell configuration where the antennas on the same MIMO antenna branch/port share the same signal to send one MIMO stream of the cell, from the BBU perspective. For example, for such a static MIMO system with two antennas on each radio head, only two baseband resources are available to support MIMO.

Further, there is a relevant embodiment with a flexible cell system. In a flexible cell system, the system has more resources to support multiple cells on multiple radio heads. For example, in the IRU 5 in FIG. 1A between the Tx back-end 10 and the interface circuitry 4a-c, there is an any-port-to-any-port switch, which dynamically maps the baseband resources to the antennas of the radio heads. Each baseband resource can be interpreted as one antenna port. The switch can map any one antenna on one radio head or any multiple antennas on several radio heads to one port. In this case, the system can form different cell configurations dynamically.

For example, the system can form a one cell configuration as the previous one cell embodiments by mapping all antennas to the baseband resource corresponding to the MIMO streams of one cell, when capacity demand is not high. This can save energy by turning off HW (hardware) and/or SW (software) for the saved capacity. This can also save the resources to be pooled for other remote radio heads devices connected via other IRUs to the same BBU. When capacity demand increases, the system is able to split the cells on demand by mapping more baseband resources corresponding to multi-cells to the antennas of the remote radio head devices. In an extreme case, when baseband resources are fully provided, each remote radio head device can be one cell with MIMO capability where the baseband resource corresponding to one cell is mapped to each cell.

The flexible cell system has big advantages of pooling the baseband resources from the BBU inside a whole building covered by many remote radio head devices and the capability of dynamically changing the cell configuration, i.e. dynamic cell splitting and combining. In such a system, it is a common configuration for several remote radio head devices configured as one cell due to low capacity demand in a local area. It is also because the baseband capacity is usually not fully provided, for example to save cost in the beginning. Therefore, the flexible cell system is also supported by embodiments presented herein.

Figure 2:
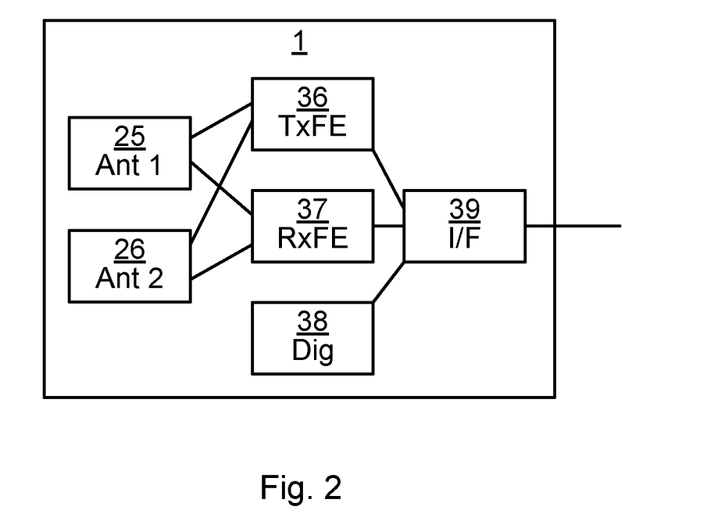
FIG. 2 is a schematic diagram illustrating components of an embodiment of a remote radio head device of FIGS. 1A-B.

FIG. 2 is a schematic diagram illustrating components of an embodiment of a remote radio head device of FIGS. 1A-B, here represented by a single remote radio head device 1. The remote radio head device comprises an interface circuitry 39, a transmission front-end 36, a reception front-end 37, a digital unit 38, a first antenna device 25 and a second antenna device 26.

In line with what is explained above, the RX Front End 37 downconverts received signals in RF to IF for transfer over the cable to the IRU 5. Moreover, the TX Front End 36 upconverts transmission signals from IF, as received over the cable from the IRU 5 to RF for transmission to wireless devices.

The first antenna device 25 and second antenna device 26 may be provided with separate streams for MIMO (Multiple Input Multiple Output) transmission and/or reception. Hence, e.g. for transmissions, the baseband module can provide a first MIMO stream for transmission on the first antenna device 25 and a second MIMO stream for transmission on the second antenna device 26. Each one of the first and second antenna devices 25, 26 may comprise one or more antenna elements. Particularly, each antenna device 25, 26 can comprise one or more antenna elements in a first polarisation and one or more antenna elements in a second polarisation to achieve an additional dimension of orthogonality. The two polarisations may be controlled separately. The antenna devices 25, 26 may also comprise appropriate filters to filter out unwanted signals.

It is to be noted that while the remote radio head device is here shown comprising two antenna devices, there may be more antenna devices, e.g. four, eight, sixteen, etc.

The interface circuitry 39 inserts and extracts (multiplexes and demultiplexes) the transmission IF signal, the received IF signal and the control signal onto/from the cable. The interface circuitry 39 may use different frequency bands for uplink signals, downlink signals and control signals to thereby multiplex all of these on a single cable.

A digital unit 38 communicates with the processor 12 of the IRU. For example, the digital unit 38 may be used to receive commands from the processor 12 to alter frequencies used by the TX Front End 36 and RX Front End 37 for upconversion and/or downconversion. The digital unit 38 can be implemented using software instructions such as a computer program executing by a processor and/or using only hardware, such as application specific integrated circuits, field programmable gate arrays, discrete logical components, etc.

Optionally, the remote radio head device is connected to the radio base station via digital transmissions (not shown). In such a case, the remote radio head device performs analogue to digital conversion, and vice versa, as well as downconversion/upconversion of the analogue signals from/to RF for reception and transmission from/to the wireless devices. The digital signal between IRU and radio head may be CPRI signal. In this case, the radio head performs the conversion between CPRI signal and RF signal.

Figure 3:
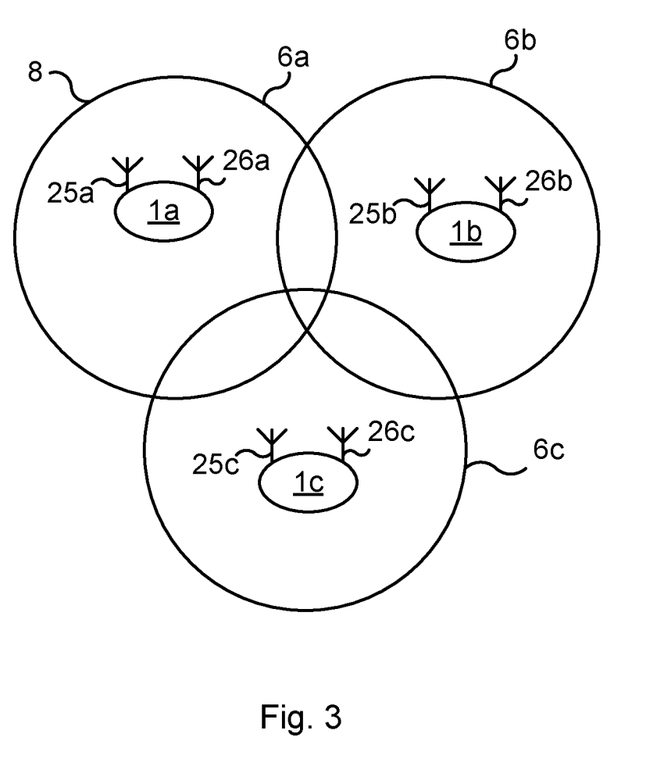
FIG. 3 is a schematic diagram illustrating cell coverage of the three remote radio head devices of FIGS. 1A-B according to one embodiment.

FIG. 3 is a schematic diagram illustrating cell coverage of the three remote radio head devices 1a-c of FIGS. 1A-B according to one embodiment. The first radio head device 1a provides coverage in a first coverage area 6a. The second radio head device 1b provides coverage in a second coverage area 6b. The third radio head device 1c provides coverage in a third coverage area 6c. The first, second and third radio head devices 1a-c each comprises a first antenna device 25a-c and a second antenna device 26a-c.

Each one of the antenna devices 25a-c, 26a-c is individually controllable. More specifically, each one of the antenna devices can be provided with an arbitrary cell id. For a single cell configuration with multiple remote radio head devices, the system can change the signal on each antenna branch, where one antenna device on each remote radio head device is connected to the same antenna branch. It means that the antennas on different remote radio head devices but connected to the same antenna branch share the same signal. To change the cell id of an antenna, the BBU can change the cell id of the antenna branch which the antenna is connected to.

A normal behaviour of a wireless terminal detecting a new cell id is that it will send a measurement report for the new cell id uplink to the network when certain criteria are fulfilled, e.g. the new cell signal strength is higher than a threshold. For example, a neighbour cell list including the signal strengths measured for all neighbour cells is reported. This is normally used to facilitate the handover process. This can be performed autonomously or as response to a measurement request from the network. In this way, the network (radio base station/BBU, even the location server in the core network) can use the measurement report to evaluate proximity between the wireless device and the source of the new cell id.

Since each remote radio head device comprises at least two antenna devices for MIMO purposes, it is here proposed to use one of these for sending a new cell id on which the wireless device in question can base the measurement report. In this way, one antenna device of each remote radio head device 1a-c can continue to be used with the first (original) cell id, and can thus be fully functional for downlink and uplink traffic. At least one antenna device of at least one remote radio head device is used for a new cell id on which the measurement report is based. This means that if there are more than two antenna devices in each remote radio head device, a smaller proportion is used for positioning using the new cell id and more antenna devices can be used for normal traffic. It is to be noted that uplink traffic does not need to be affected by using one of the antenna devices (corresponding to a DL MIMO stream) for positioning purposes.

A number of different embodiments of how to use cell ids for positioning will now be presented with reference to respective tables. Antenna device is abbreviated with AD and remote radio head device is abbreviated with RRHD. In the tables, capital single letters indicate cell ids. '-' indicates no cell id being transmitted, i.e. that the antenna device in question is off for downlink traffic. The time period column indicates a passing of time from lower to higher numbers. It is to be noted, however, that the rows may have different durations.

When a new cell id is transmitted, this also implies transmitting its corresponding DL common channel signaling for positioning.

In one embodiment, the antenna devices are configured according to Table 1:

TABLE 1

| | one new cell id used in succession | | | | | |
|---|---|---|---|---|---|---|
| Time period | $1^{st}$ AD of $1^{st}$ RRHD, 25a | $2^{nd}$ AD of $1^{st}$ RRHD, 26a | $1^{st}$ AD of $2^{nd}$ RRHD, 25b | $2^{nd}$ AD of $2^{nd}$ RRHD, 26b | $1^{st}$ AD of $3^{rd}$ RRHD, 25c | $2^{nd}$ AD of $3^{rd}$ RRHD, 26c |
| 1 | A | A | A | A | A | A |
| 2 | B | A | — | A | — | A |
| 3 | — | A | B | A | — | A |
| 4 | — | A | — | A | B | A |
| 5 | A | A | A | A | A | A |

In the embodiment illustrated in Table 1, in time period 1, a first (regular) cell id A is transmitted using all antenna devices of all remote radio head devices. This is the normal scenario prior to using cell ids to trigger measurement reports for determining a position. All available DL MIMO streams (two in this example) can be used as normal at this time.

In time period 2, the first antenna device 25a of the first remote radio head device 1a is used to transmit a new cell id B. At the same time, the first antenna devices 25b-c of the second and third remote radio head devices 1b-c are turned off. Here, it is assumed that 25a-c is connected to the same antenna branch/port from the BBU perspective and therefore they are broadcasting the same signal in a normal state. At this time, any wireless device detecting the new cell id B will perform measurements and send a measurement report associated with the cell id B via uplink in the network. The measurements can e.g. include a signal strength, a time indicator (which can be translated to a distance) relating to how long it takes a radio signal to propagate between the wireless device in question and the source of the new cell id B (i.e. the first remote radio head device 1a), a time of arrival difference between cell A and cell B. During this time period, one DL MIMO stream can still be used, which may reduce throughput, but does not interrupt traffic. For the signal strength measurement, the measurement report may be a neighbour cell list report.

Time period 3 is equivalent to time period 2, but here the new cell id B is transmitted from the first antenna device 25b of the second remote radio head device 1b.

Time period 4 is equivalent to time period 2 and 3, but here the new cell id B is transmitted from the first antenna device 25c of the third remote radio head device 1c.

Once all remote radio head devices have been instructed to transmit the new cell id B, in time period 5, the first cell id A is again transmitted using all antenna devices of all remote radio head devices. It is now again possible to use all available DL MIMO streams.

After receiving the measurements reports for the new cell id B from all the different remote radio head devices 1a-c, the network node (e.g. the IRU or radio base station) can determine, for a particular wireless device, which remote radio head device 1a-c is the closest, e.g. as the remote radio head device for which the new cell id B has the strongest received signal at the wireless device. Optionally, e.g. if distances can be worked out to the remote radio head devices 1a-c (e.g. using time indicators), a more accurate position can be determined.

Optionally, time periods 3 and/or 4 can be omitted if sufficient accurate position determination can be made already after time period 2, e.g. by determining that a wireless device in question is very close to a particular remote radio head device, e.g. by a signal strength being above a threshold value or a timing advance value being less than a threshold value.

In one embodiment, the antenna devices are configured according to Table 2:

TABLE 2 different new cell id used in succession

| Time period | $1^{st}$ AD of $1^{st}$ RRHD, 25a | $2^{nd}$ AD of $1^{st}$ RRHD, 26a | $1^{st}$ AD of $2^{nd}$ RRHD, 25b | $2^{nd}$ AD of $2^{nd}$ RRHD, 26b | $1^{st}$ AD of $3^{rd}$ RRHD, 25c | $2^{nd}$ AD of $3^{rd}$ RRHD, 26c |
|---|---|---|---|---|---|---|
| 1 | A | A | A | A | A | A |
| 2 | B | A | — | A | — | A |
| 3 | — | A | C | A | — | A |
| 4 | — | A | — | A | D | A |
| 5 | A | A | A | A | A | A |

This embodiment is similar to the embodiment illustrated in Table 1. However, here each new remote radio head device sending a new cell id uses another cell id. I.e. the first remote radio head device 1a uses the new cell id B, while the second remote radio head device uses the new cell id C and the third remote radio head device 1c used the new cell id D.

While this uses up more cell ids in the process, the measurement reports are more easily distinguishable by the network node.

In one embodiment, the antenna devices are configured according to Table 3:

TABLE 3 simultaneous different new cell ids

| Time period | $1^{st}$ AD of $1^{st}$ RRHD, 25a | $2^{nd}$ AD of $1^{st}$ RRHD, 26a | $1^{st}$ AD of $2^{nd}$ RRHD, 25b | $2^{nd}$ AD of $2^{nd}$ RRHD, 26b | $1^{st}$ AD of $3^{rd}$ RRHD, 25c | $2^{nd}$ AD of $3^{rd}$ RRHD, 26c |
|---|---|---|---|---|---|---|
| 1 | A | A | A | A | A | A |
| 2 | B | A | C | A | D | A |
| 3 | A | A | A | A | A | A |

This embodiment is similar to the embodiment shown in Table 2. However, here the new cell ids are transmitted simultaneously using the respective first antenna devices 25a-c. In this case, the system is a flexible cell system and it has three additional baseband resources to form three new cells.

Once the closest remote radio head device is found, e.g. as described with reference to any one of Tables 1-3 above, the location of the closest remote radio head device can be used as a reference location for an E-CID (enhanced Cell ID) procedure. For example, the signal travel time derived from timing advance and/or RTT (Round Trip Time) can determine the range around the closest remote radio head device. Also the signal strength of neighbouring remote radio head devices can help in determining the location of the wireless device.

In one embodiment, the antenna devices used for the new cell id sends a reference signal for DL-OTDOA (Observed Time Difference of Arrival) measurements. The wireless device measures the time difference of arrival between the serving cell (i.e. the cell of the closest remote radio head device) and the new cell and feeds back this measurement. The closest remote radio head device can be determined, if the time difference is smaller than a threshold. The measurements from several remote radio head devices can be used to position the wireless device by multilateration.

Figure 4A:
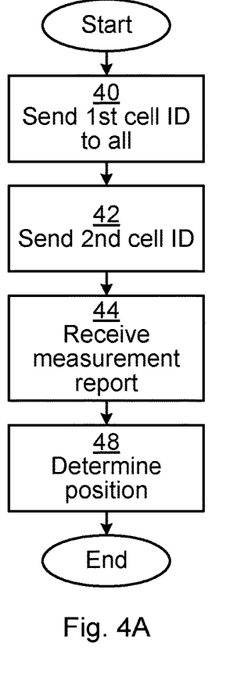
FIGS. 4A-C are flow charts illustrating methods performed in a network node of FIG. 1 for determining a position of a wireless device.
Figure 4B:
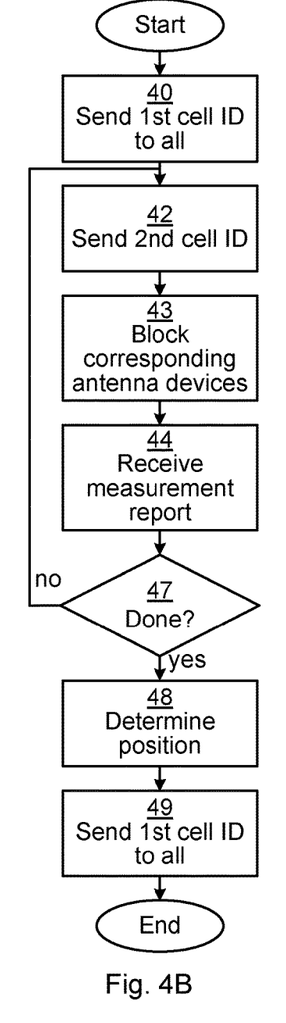
Figure 4C:
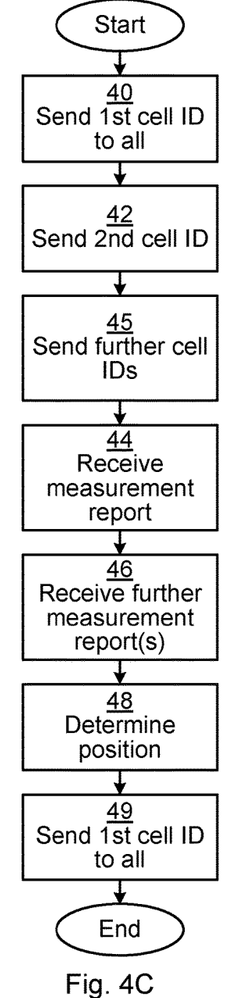

FIGS. 4A-C are flow charts illustrating methods performed in a network node of FIG. 1 for determining a position of a wireless device. The network node can be the radio base station 7 or the IRU 5 of FIGS. 1A-B. In any case, the network node is connected to a plurality of remote radio head devices as described above. As explained above, each antenna device comprises a first antenna device which can be used for a first MIMO, multiple input multiple output, stream and a second antenna device which can be used for a second MIMO stream. The method can e.g. be started when a request for a position of a specific wireless device is received by the network node.

In a send $1^{st}$ cell id to all step 40, a first cell identifier is sent for transmission on both the first antenna device and the second antenna device of each one of the remote radio head devices. This step corresponds to time period 1 of Tables 1-3 above.

In a send $2^{nd}$ cell id step 42, a second cell identifier is sent, for transmission on an antenna device of only a specific remote radio head device. This corresponds to time period 2 of Tables 1-3 above.

Optionally, this comprises sending the second cell identifier for transmission on a strict subset of antenna devices of the plurality of antenna devices of the specific remote radio head device. In other words, the second cell identifier would in this case not be sent using all antenna devices of the specific remote radio head device. In this way, the antenna devices not sending the second cell identifier can be used for the first (regular) cell identifier. In one embodiment, the second cell identifier is only sent using one antenna device of the specific remote radio head device. This is sufficient to make the wireless device generate a measurement report. In this way, all other antenna devices can be used for the first (regular) cell identifier and thus also for traffic.

Optionally, a specific wireless device may be requested to measure and report the signal strength of a specific cell, in this case for the second cell id.

In a receive measurement report step 44, a measurement report is received from the wireless device associated with the second cell identifier. The measurement report can e.g. comprise parameter indicating a signal strength associated with the second cell identifier, e.g. RSSI (Receives Signal Strength Indicator).

Alternatively or additionally, the measurement report can comprise a parameter indicating a distance from the specific remote radio head device transmitting the second cell identifier. The distance can for instance be expressed as a time indicator from the source of the second cell identifier, e.g. a timing advance (TA) value.

The measurement report, e.g. the neighbour cell list, can be a report which is normally used to assess cells as to whether handover is to be performed. The wireless device always actively monitors the RSSIs from all cells (serving cell and neighbour cells) periodically and upon request from the network. When certain criteria are fulfilled, the wireless device is triggered to send back the neighbour cell list to the network. For example, when a neighbour cell signal strength is higher than a threshold, the wireless device sends the neighbour cell list back to the network automatically. A neighbour cell list includes the neighbour cell ids, their corresponding signal strength indicators (e.g. RSSI, RSCP (Received Signal Code Power), RSRP (Reference Signal Received Power)) and/or signal quality indicators (e.g. RSRQ (Reference Signal Received Quality)) measured. This is used to facilitate the network to make handover decisions. This kind of report may also be requested from the network side.

In a determine position step 48, a position of the wireless device is determined based on the received measurement report, as explained with reference to Tables 1-3 above.

Using this method, the positioning of a wireless device is improved significantly for a system where remote radio head devices are used and where normally a single cell id is used for multiple remote radio head devices. Moreover, there is no need for any modifications of the wireless devices for this method to work.

FIG. 4B is a flow chart illustrating a method similar to the method illustrated in FIG. 4A. Only new steps or steps which are modified compared to the method illustrated in FIG. 4A will be described below.

In an optional block corresponding antenna devices step 43, any cell identifier to the antenna devices of each remote radio head device being distinct from the specific remote radio head device are blocked. The antenna devices correspond to the antenna device of the specific remote radio head device which transmits the second cell identifier. For instance, if a first MIMO antenna device of the specific remote radio head device is used for the second cell identifier, then the first MIMO antenna devices of the other remote radio head devices are blocked. This corresponds to no cell id being transmitted in time periods 2-4 of Tables 2 and 3 above. This is needed when there are no additional resources than doing MIMO. Basically, one baseband resource originally used for one MIMO stream is used to transmit the second cell signal for positioning.

In an optional conditional done step 47, it is determined whether other specific remote radio head devices need to be utilised for new cell ids (such as the $2^{nd}$ cell id). If this is the case, the method returns to the send $2^{nd}$ cell id step 42. Otherwise, the method proceeds to the determine position step 48. In one embodiment, the method loops through all remote radio head devices connected to the network node. In one embodiment, if a sufficiently strong indication is received in the measurement report, the looping is aborted and the method proceeds to the determine position step 48. In this way, the method can perform time periods 3 and 4 of Tables 1 and 2.

In a send $1^{st}$ cell id to all step 49, the first cell identifier is sent for transmission on both the first antenna device and the second antenna device of each one of the remote radio head devices. This implies that the antenna devices are used as before, with the first cell identifier being used for all antenna devices. In this way, the antenna devices and the remote radio head devices can be used at full capacity again. This step corresponds to time periods of Tables 1-2 above and time period 3 of Table 3 above.

FIG. 4C is a flow chart illustrating a method similar to the method illustrated in FIG. 4A.

In a send further cell ids step 45, one or more further cell identifiers are sent for transmission on an antenna device of the remote radio head devices which are distinct from the specific remote radio head device. These further cell identifiers are provided such that each one of these remote radio head devices is sent a different cell identifier. This step corresponds to the sending of new cell ids in time periods 3 and 4 of Table 2 and/or time period 2 of Table 3. This applies for a flexible cell system, which has spare baseband resources to support more antenna ports connected to individual antenna devices on different radio heads for transmitting extra cell ids on one antenna of different radio heads. The maximum number of new cells equals the number of spare baseband resources plus 1.

In a receive further measurement report(s) step 46, one or more further measurement reports are received from the wireless device. These measurement report(s) are associated with each one of the one or more further cell identifiers in the same way as described for the second cell identifier above. Also here, the measurement report(s) can e.g. comprise parameter indicating a signal strength associated with the second cell identifier and/or a parameter indicating a distance from the remote radio head device(s) transmitting the further cell identifier(s). The distance can for instance be expressed as a time delay from the source of the second cell identifier, e.g. a timing advance (TA) value.

The method of FIG. 4C corresponds to the embodiments summarised in Table 2 and/or Table 3 above.

The send $1^{st}$ cell id to all step 49 is equivalent to the send $1^{st}$ cell id to all step 49 of FIG. 4B.

Figure 5:
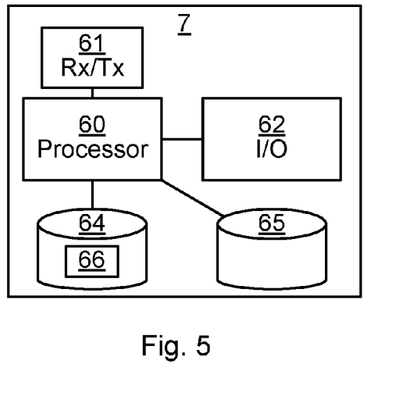
FIG. 5 is a schematic diagram showing some components of an embodiment of the radio base station of FIGS. 1A-BC.

FIG. 5 is a schematic diagram showing some components of the radio base station 7 of FIGS. 1A-B. A processor 60 is provided using any combination of one or more of a suitable central processing unit (CPU), multiprocessor, microcontroller, digital signal processor (DSP), application specific integrated circuit (ASIC) etc., capable of executing software instructions 66 stored in a memory 64, which can thus be a computer program product. The processor 60 can be configured to execute the methods described with reference to FIGS. 4A-C above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory. The data memory 65 can e.g. store measurement reports received from wireless devices to be used for positioning of the wireless device as described above.

The radio base station 7 further comprises an I/O interface 62 for communicating with a core network and optionally with other radio base stations.

The radio base station 7 also comprises one or more transceivers 61, comprising analogue and digital components for radio communication with wireless devices within one or more radio cells, e.g. using remote radio head devices as described above. The processor 60 controls the general operation of the radio base station 7, e.g. by sending control signals to the transceiver 61 and receiving reports from the transceiver 61 of its operation.

Other components of the radio base station 7 are omitted in order not to obscure the concepts presented herein.

Figure 6:
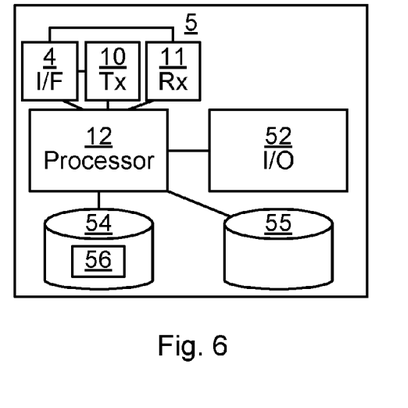
FIG. 6 is a schematic diagram showing some components of an embodiment of any one of the intermediate radio units of FIGS. 1A-B.

FIG. 6 is a schematic diagram showing some components of an embodiment of any one of the intermediate radio units 5 of FIGS. 1A-B, here represented by a single intermediate radio unit 5. A processor 12, e.g. in the form of a processor, is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 12 can be configured to execute the methods described with reference to FIGS. 4A-C above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 55 can be any combination of read and write memory (RAM) and read only memory (ROM). The data memory 55 may also comprise persistent storage, which, for example, can be any single one or combination of magnetic memory, optical memory, solid state memory or even remotely mounted memory. The data memory 55 can e.g. store measurement reports received from wireless devices to be used for positioning of the wireless device as described above.

The intermediate radio unit 5 further comprises an interface circuitry 4, a transmitter back-end 10 and receiver back-end 11 which operate as described with reference to FIGS. 1A-B above.

The intermediate radio unit 5 may separate from and connected to a radio base station, or form part of a hosting radio base station. When the intermediate radio unit 5 forms part of a hosting radio base station, some or all of the components of FIG. 6 may also be used for other purposes within the radio base station and may e.g. be the equivalent components shown in FIG. 5.

Other components of the intermediate radio unit 5 are omitted in order not to obscure the concepts presented herein.

Figure 7:
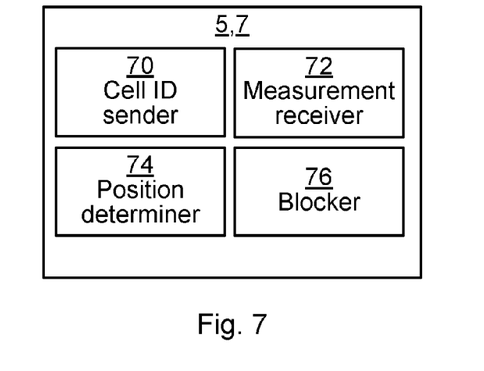
FIG. 7 is a schematic diagram showing functional modules of an embodiment of the radio base station and/or the intermediate radio unit of FIGS. 1A-B.

FIG. 7 is a schematic diagram showing functional modules of an embodiment of the radio base station and/or the IRU of FIGS. 1A-B. The modules can be implemented using software instructions such as a computer program executing in the radio base station 7 and/or IRU 5 and/or using hardware, such as application specific integrated circuits, field programmable gate arrays, discrete logical components, etc. The modules correspond to the steps in the methods illustrated in FIGS. 4A-C.

A cell id sender 70 is arranged to send a first cell identifier for transmission on both the first antenna device and the second antenna device of each one of the remote radio head devices and to send a second cell identifier, for transmission on an antenna device of only a specific remote radio head device. Moreover, the cell id sender 70 is optionally arranged to send one or more further cell identifiers for transmission on an antenna device of the remote radio head devices which are distinct from the specific remote radio head device, such that each one of these remote radio head devices is sent a different cell identifier. This module corresponds to the send $1^{st}$ cell id to all step 40 and the send $2^{nd}$ cell id step 42 of FIGS. 4A-C. Moreover, this module corresponds to the send $1^{st}$ cell id to all step 49 of FIGS. 4B-C and the send further cell id step 45 of FIG. 4C. It should be noted that the signal transmitted with the $1^{st}$ cell identifier includes all DL signalling and DL traffic. The signal transmitted with the new cell ids (a second and/or more further cell ids) for positioning includes the DL common channel signalling only, without carrying any traffic.

A measurement receiver 72 is arranged to receive a measurement report from the wireless device indicating a signal strength of a signal associated with the second cell identifier, and optionally receive one or more measurement reports from the wireless device indicating a signal strength of a signal associated with each one of the one or more further cell identifiers. It also supports other types of measurement data from the wireless device, e.g. time delay and time difference of arrival. This module corresponds to the receive measurement report 44 step of FIGS. 4A-C and the receive further measurement report(s) step 46 of FIG. 4C.

A position determiner is arranged to determine a position of the wireless device based on the received measurement report. This module corresponds to the determine position step of FIGS. 4A-C.

A blocker 76 is arranged to block any cell identifier to the antenna devices of each remote radio head device being distinct from the specific remote radio head device, which antenna devices correspond to the antenna device of the specific remote radio head device which transmits the second cell identifier. This module corresponds to the block corresponding antenna devices step of FIG. 4B.

Figure 8:
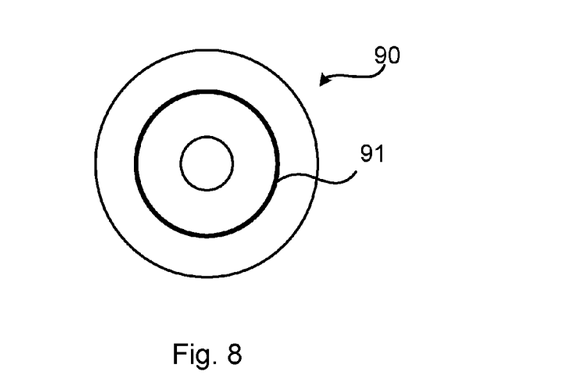
FIG. 8 shows one example of a computer program product comprising computer readable means.

FIG. 9 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 5 or the computer program product 56 of FIG. 6. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining a position of a wireless device, the method being performed by a system having a network node connected to a plurality of remote radio head devices each comprising a first antenna device which can be used for a first MIMO, multiple input multiple output, stream and a second antenna device which can be used for a second MIMO stream, the method comprising the steps of:

sending a first cell identifier, from the network node, for transmission on both the first antenna device and the second antenna device of each one of the remote radio head devices;

sending a second cell identifier, from the network node, for transmission on the first antenna device of only a specific remote radio head device of the plurality of remote radio head devices while sending the first cell identifier for transmission on the second antenna device of the specific remote radio head device;

transmitting the first cell identifier from each of the remote radio head devices on both of the first antenna device and the second antenna device of each one of the remote radio head devices;

transmitting, by the specific remote radio head device of the plurality of remote radio head devices, the second cell identifier on the first antenna device of the specific remote radio head device;

receiving, at the network node, a measurement report from the wireless device associated with the second cell identifier; and determining, at the network node, the position of the wireless device based on the received measurement report.

2. The method according to claim 1, wherein the steps of sending the second cell identifier and receiving the measurement report are repeated for each one of the plurality of remote radio head devices.

3. The method according to claim 1, wherein the step of sending the second cell identifier comprises sending the second cell identifier for transmission on a strict subset of antenna devices of a plurality of antenna devices of the specific remote radio head device.

4. The method according to claim 1, wherein the step of sending the second cell identifier comprises sending the second cell identifier using only one antenna device of a plurality of antenna devices of the specific remote radio head device.

5. The method according to claim 1, further comprising:
sending one or more further cell identifiers for transmission on an antenna device of the remote radio head devices which are distinct from the specific remote radio head device, such that each one of these remote radio head devices is sent a different cell identifier; and
receiving one or more further measurement reports from the wireless device indicating a signal strength of a signal associated with each one of the one or more further cell identifiers.

6. The method according to claim 1, further comprising a step of:
blocking any cell identifier to the antenna devices of each remote radio head device being distinct from the specific remote radio head device, where the antenna devices correspond to the antenna device of the specific remote radio head device which transmits the second cell identifier.

7. The method according to claim 1 wherein the step of receiving the measurement report comprises receiving a measurement report indicating a signal strength associated with the second cell identifier.

8. The method according to claim 1 wherein the step of receiving the measurement report comprises receiving a measurement report indicating a distance from the specific remote radio head device transmitting the second cell identifier.

9. A system for determining a position of a wireless device, the system comprising:

a network node and a plurality of remote radio head devices, the network node comprising:
a processor; and
a memory storing instructions that, when executed by the processor, causes the network node to:
send a first cell identifier for transmission on both the first antenna device and the second antenna device of each one of the remote radio head devices;
send a second cell identifier, for transmission on the first antenna device of only a specific remote radio head device of the plurality of remote radio head devices while sending the first cell identifier for transmission on the second antenna device of the specific remote radio head device;
receive a measurement report from the wireless device associated with the second cell identifier; and
determine the position of the wireless device based on the received measurement report;

each of the plurality of remote radio head devices comprising:
a first antenna device which can be used for a first MIMO, multiple input multiple output, stream; and
a second antenna device which can be used for a second MIMO stream, wherein each of the remote radio head devices transmits the first cell identifier on both of the first antenna device and the second antenna device and the specific remote radio head device of the plurality of remote radio head devices transmits the second cell identifier on the first antenna device of the specific remote radio head device.

10. The system according to claim 9, further comprising instructions that, when executed by the network node processor, cause the network node to repeat the instructions to send the second cell identifier and receive the measurement report and are repeated for each one of the plurality of remote radio head devices.

11. The system according to claim 9, wherein the instructions to send the second cell identifier comprise instructions that, when executed by the network node processor, cause the network node to send the second cell identifier for transmission on a strict subset of antenna devices of a plurality of antenna devices of the specific remote radio head device.

12. The system according to claim 9, wherein the instructions to send the second cell identifier comprise instructions that, when executed by the network node processor, cause the network node to send the second cell identifier using only one antenna device of a plurality of antenna devices of the specific remote radio head device.

13. The system according to claim 9, further comprising instructions that, when executed by the network node processor, cause the network node to:
send one or more further cell identifiers, for transmission on an antenna device of the remote radio head devices which are distinct from the specific remote radio head device, such that each one of these remote radio head devices is sent a different cell identifier; and
receive one or more measurement reports from the wireless device indicating a signal strength of a signal associated with each one of the one or more further cell identifiers.

14. The system according to claim 9, further comprising instructions that, when executed by the network node processor, cause the network node to: block any cell identifier to antenna devices of each remote radio head device being distinct from the specific remote radio head device, where the antenna devices correspond to the antenna device of the specific remote radio head device which transmits the second cell identifier.

15. The system according to claim 9, further comprising instructions that, when executed by the network node processor, cause the network node to: send the first cell identifier for transmission on both the first antenna device and the second antenna device of each one of the remote radio head devices.

16. The system according to claim 9, wherein the instructions to receive the measurement report comprise instructions that, when executed by the network node processor, cause the network node to receive a measurement report indicating a signal strength associated with the second cell identifier.

17. The system according to claim 9, wherein the instructions to receive the measurement report comprise instructions that, when executed by the network node processor, cause the network node to receive a measurement report indicating a distance from the specific remote radio head device transmitting the second cell identifier.

18. A computer program product for a system for determining a position of a wireless device, the system including a network node having a processor and a plurality of remote radio head devices where the network node is connectable to the plurality of remote radio head devices each comprising a first antenna device which can be used for a first MIMO, multiple input multiple output, stream and a second antenna device which can be used for a second MIMO stream, the computer program product stored on a non-transitory computer-readable storage medium and including instructions to cause the processor of the network node to:
- send a first cell identifier for transmission on both the first antenna device and the second antenna device of each one of the remote radio head devices;
- send a second cell identifier, for transmission on the first antenna device of only a specific remote radio head device of the plurality of remote radio head devices while sending the first cell identifier for transmission on the second antenna device of the specific remote radio head device;
- transmit the first cell identifier from each of the remote radio head devices on both of the first antenna device and the second antenna device of each one of the remote radio head devices;
- transmit, by the specific remote radio head device of the plurality of remote radio head devices, the second cell identifier on the first antenna device of the specific remote radio head device;
- receive a measurement report from the wireless device associated with the second cell identifier; and
- determine the position of the wireless device based on the received measurement report.

\* \* \* \* \*